United States Patent
Wehrle et al.

(10) Patent No.: US 9,810,527 B2
(45) Date of Patent: Nov. 7, 2017

(54) IMAGE DETECTION SYSTEM FOR DETECTING AN OBJECT

(71) Applicant: SICK AG, Waldkirch (DE)

(72) Inventors: Klemens Wehrle, Waldkirch (DE); Long Lu, Waldkirch (DE)

(73) Assignee: SICK AG, Waldkirch (DE)

( * ) Notice: Subject to any disclaimer, the term of this patent is extended or adjusted under 35 U.S.C. 154(b) by 0 days.

(21) Appl. No.: 14/793,864

(22) Filed: Jul. 8, 2015

(65) Prior Publication Data

US 2016/0010979 A1    Jan. 14, 2016

(30) Foreign Application Priority Data

Jul. 9, 2014    (EP) ..................................... 14176351

(51) Int. Cl.
| | |
|---|---|
| G01B 11/24 | (2006.01) |
| G06K 9/20 | (2006.01) |
| G06K 7/10 | (2006.01) |

(52) U.S. Cl.
CPC .......... *G01B 11/24* (2013.01); *G06K 7/10732* (2013.01); *G06K 9/2018* (2013.01); *G06K 9/2027* (2013.01)

(58) Field of Classification Search
CPC .... G01B 11/24; G06K 9/2018; G06K 9/2027; G06K 7/00; G06K 7/10732
USPC ................................................ 356/601–640
See application file for complete search history.

(56) References Cited

U.S. PATENT DOCUMENTS

| | | | |
|---|---|---|---|
| 6,421,451 B1 * | 7/2002 | Shiratsuchi | .......... G06K 9/2036 356/613 |
| 2005/0088529 A1 | 4/2005 | Geng | |
| 2007/0252078 A1 | 11/2007 | Kaltenbach et al. | |
| 2011/0150346 A1 | 6/2011 | Panetta | |

FOREIGN PATENT DOCUMENTS

| | | |
|---|---|---|
| EP | 0 898 163 A1 | 2/1999 |
| EP | 1 890 134 A2 | 2/2008 |
| EP | 2 126 781 B1 | 5/2010 |
| EP | 1 850 269 B1 | 8/2010 |
| JP | H9-297812 A | 11/1997 |

* cited by examiner

*Primary Examiner* — Tri T Ton
(74) *Attorney, Agent, or Firm* — Nath, Goldberg & Meyer; Jerald L. Meyer; Stanley N. Protigal

(57) ABSTRACT

To obtain a high-resolution image on a detection of a contour of an object, an image detection system for detecting an object is provided which comprises a defined detection zone in which the object moved through the detection zone is detectable; at least two lighting units for lighting the detection zone with a respective light beam; and at least two light reception units for receiving light reflected at the object, wherein one respective lighting unit is associated with a light reception unit, and wherein the lighting units each transmit their light beams at a defined light wavelength and the light reception units are configured to receive a respective light wavelength of the reflected light associated with them, wherein the one light reception unit receives a different light wavelength than the other light reception unit.

14 Claims, 4 Drawing Sheets

IMAGE DETECTION SYSTEM FOR DETECTING AN OBJECT

Figure 1:
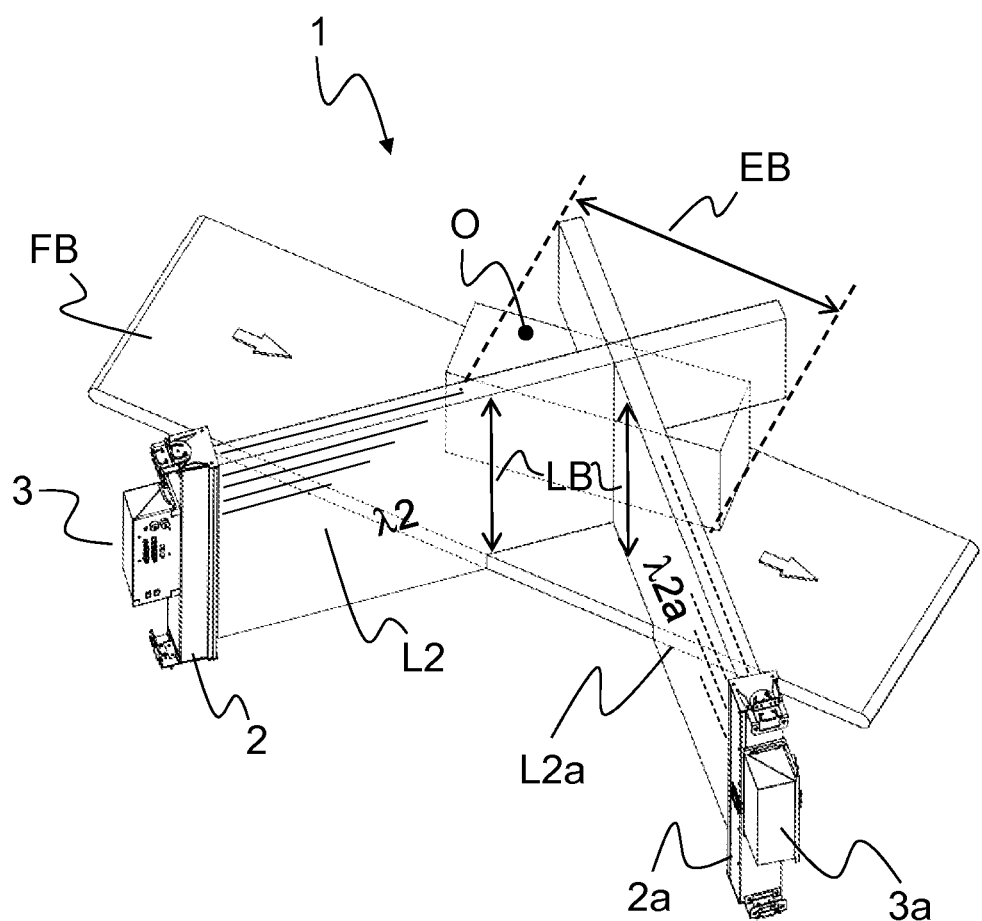

The invention relates to an image detection system for detecting an object comprising a defined detection zone in which the object moved through the detection zone can be detected; at least two lighting units for lighting the detection zone with a respective light beam; and at least two light reception units for receiving light reflected at the object.

In today's industry, the degree of automation of a technical plant is increasing all the time so that objects such as packets or assembly parts are conveyed from A to B in automated operation. It is important in this respect that the objects moved on a conveying belt are detected correctly and at a required degree of detail. In particular e.g. when an identification barcode on the object is to be read out, a clear detection of the contour of the object, on the one hand, and of the identification barcode, on the other hand, must be ensured.

For this purpose, the conveyor belt is lighted from different directions by lighting units and an object moved on the conveyor belt is detected by light reception units which detect light reflected at the object.

The problem arises that on the arrangement of the lighting units, the light beams of the lighting units can or have to cross to allow a space-saving plant. However, an overexposure hereby occurs so that the image quality of the light reception units is negatively influenced.

EP 1 850 269 B1 describes a plurality of lighting units, which may be arrays of light emitting diodes (LEDS) and light receiver sensors. EP 1 850 269 B1 discloses an above-described scanning apparatus in which a crossover of the light beams of the lighting units occurs and an overexposure can take place. EP 1 850 269 B1 proposes in this respect to solve the problem of overexposure by changing the operating state of the scanning apparatus, in particular of the lighting units and/or light reception units.

Specifically, in accordance with EP 1 850 269 B1, the sensitivity of at least one of the light reception units should be reduced in the overlap zone and/or the intensity of one of the lighting units should be reduced or completely switched off in the overlap zone.

A described scanning apparatus is furthermore likewise known from EP 2 126 781 B1 in which the problem of the overexposure during scanning due to a crossover of the light beams was recognized. EP 2 126 781 B1 describes two lighting devices, for example LED or solid state or lamp based lighting devices in general, lighting a region.

A synchronized lighting of the object on the conveyor belt by light pulses is proposed as a solution to the problem for this purpose so that the object is always only exposed by one lighting unit and is detected by one light reception unit in the possible overlap zone of the lighting units and light reception units.

It is therefore an object of the invention to improve an image detection system for detecting an object such that an avoidance of an overexposure in the detection and thus an increased image quality of the image detection system can be achieved.

The object is satisfied in accordance with the invention by an image detection system for detecting an object, wherein the image detection system comprises a defined detection zone in which the object moved through the detection zone is detectable; by at least two lighting units for lighting the detection zone with a respective light beam; and by at least two light reception units for receiving light reflected at the object, wherein one respective lighting unit is associated with a light reception unit, and wherein the lighting units each transmit their light beams at a defined light wavelength and the light reception units are configured to receive a respective light wavelength of the reflected light associated with them, wherein the one light reception unit receives a different light wavelength than the other light reception unit.

This has the advantage that the image detection system can have a very compact structure thanks to a multiple crossing over of the light beams of the lighting units, wherein the different light wavelengths used, in particular light beams in different colors, of the lighting units do not result in any overexposure.

A simple operation of the image detection system and thus a stable detection of the object furthermore results as a further advantage with respect to the prior art since the function of the lighting units and light reception units such as the lighting intensity or lighting duration or the detection point in time of the object do not have to be continuously varied or regulated or synchronized during the operation. Such a regulation or synchronization has to be controlled in dependence on the conveyor belt speed such that the control of the image detection system in accordance with the invention can be configured without this dependence and the image detection system in accordance with the invention can accordingly be simply integrated at different conveyor belts, in particular at already present conveyor belts.

The image detection system in accordance with the invention furthermore has an increased service life as an advantage since a continuous operation of the lighting units and light reception units is ensured and the lighting units and light reception units are not exposed to any ongoing peak load such as a switching on and off.

In accordance with a preferred embodiment, the light reception units comprises a line scan camera having an optical filter for the associated defined light wavelength. Every light reception unit is thereby able to detect only the defined light wavelength associated with it and to dismiss the reflected light with the other light wavelengths.

In accordance with a further preferred embodiment, the lighting unit and light reception unit have a reading zone which is defined by the light beam at the defined light wavelength.

Furthermore, in accordance with a further preferred embodiment, the lighting units and light reception units are arranged such that the reading zones of the lighting units and light reception units partly cross over, preferably at 45° with respect to one another, such that the object is lighted at the crossover of at least two light beams at different light wavelengths.

In accordance with a further preferred embodiment, a plurality of lighting units and light reception units are provided which are directed toward one another and the object is lighted by a corresponding number of light beams so that all the sides of the object are detectable.

In accordance with a further preferred embodiment, the light beams comprise light wavelengths of the colors red, blue, yellow and/or green.

In accordance with a further preferred embodiment, the lighting units whose light beams intersect transmit light beams of different light wavelengths.

In accordance with a further preferred embodiment, the lighting units whose light beams do not intersect transmit light beams of the same light wavelengths.

The apparatus in accordance with the invention or the method in accordance with the invention can be designed in a similar manner by further features and show similar advantages in this respect. Such further features are described in an exemplary, but not exclusive manner in the dependent claims following the independent claims.

Figure 2:
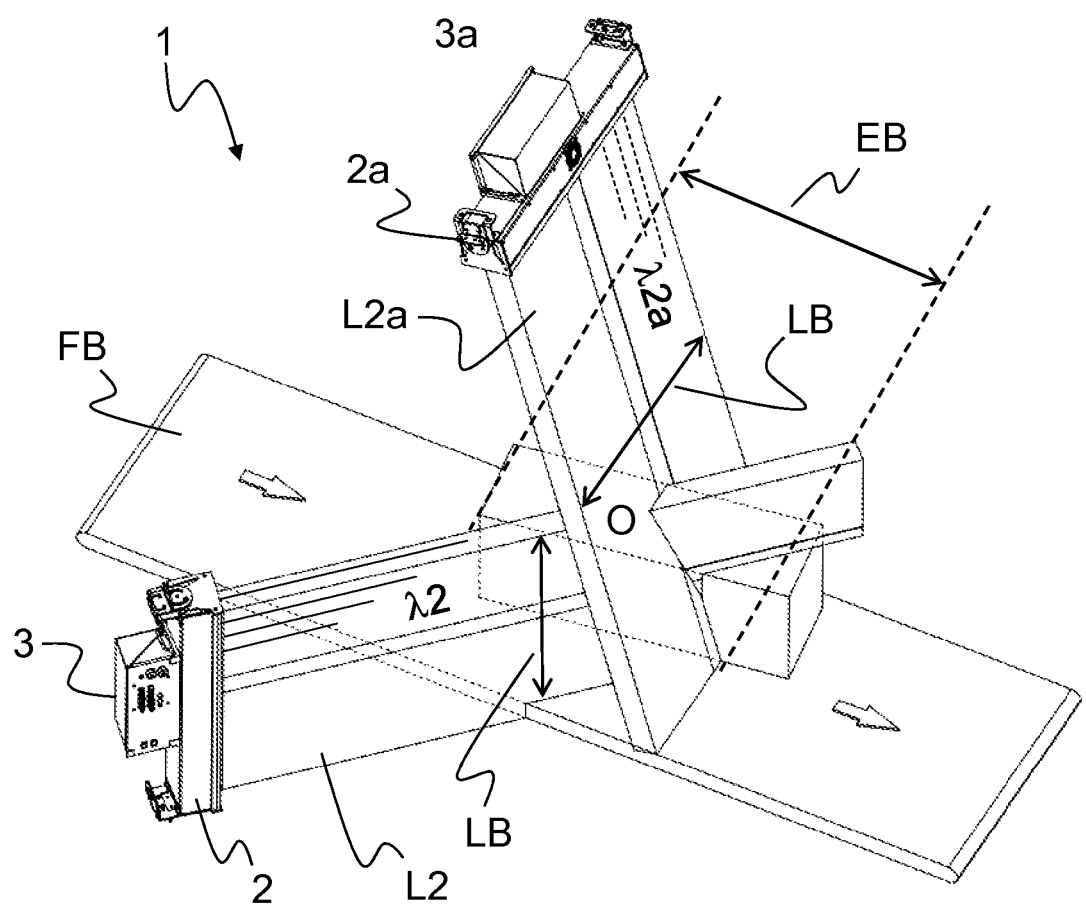
Figure 3:
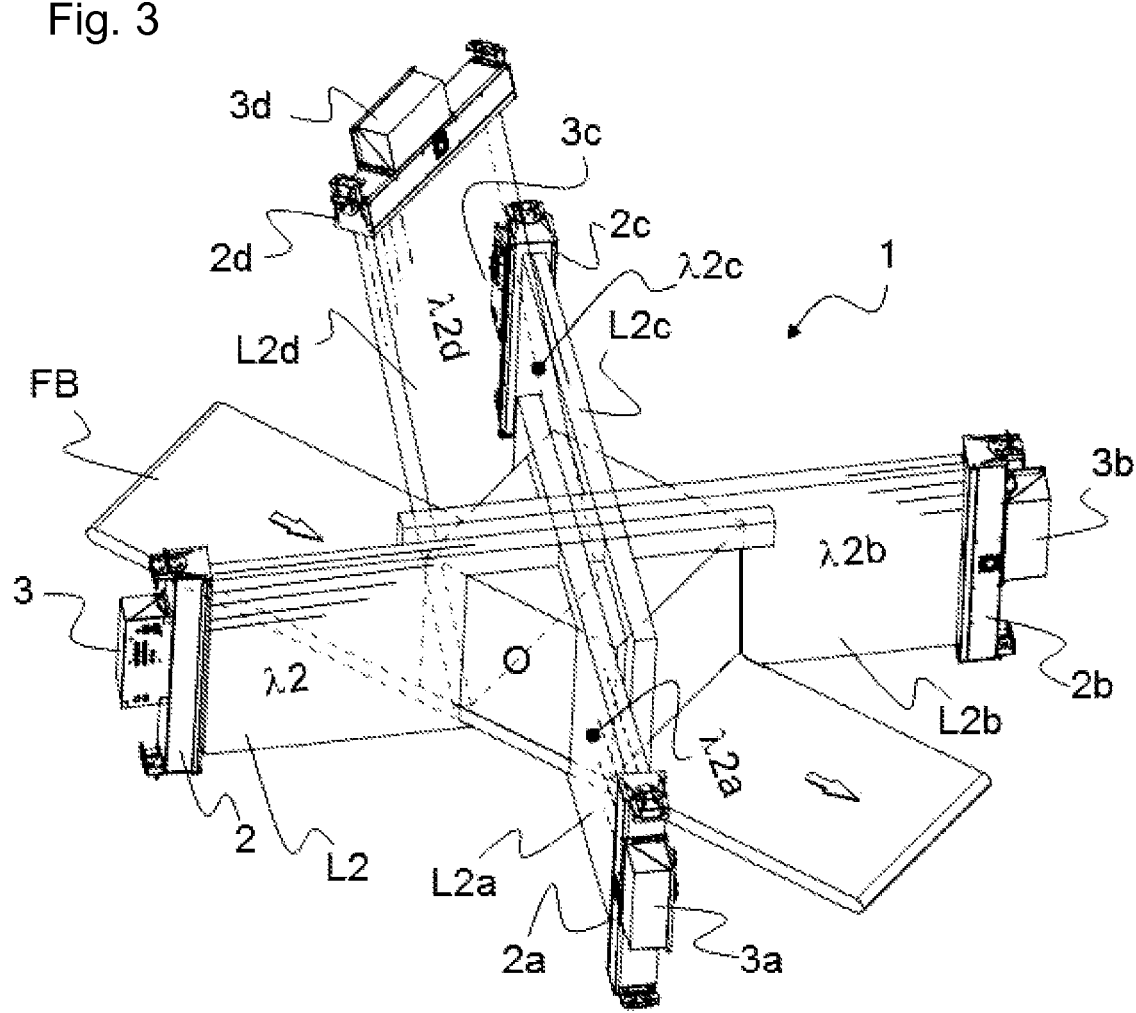
Figure 4:
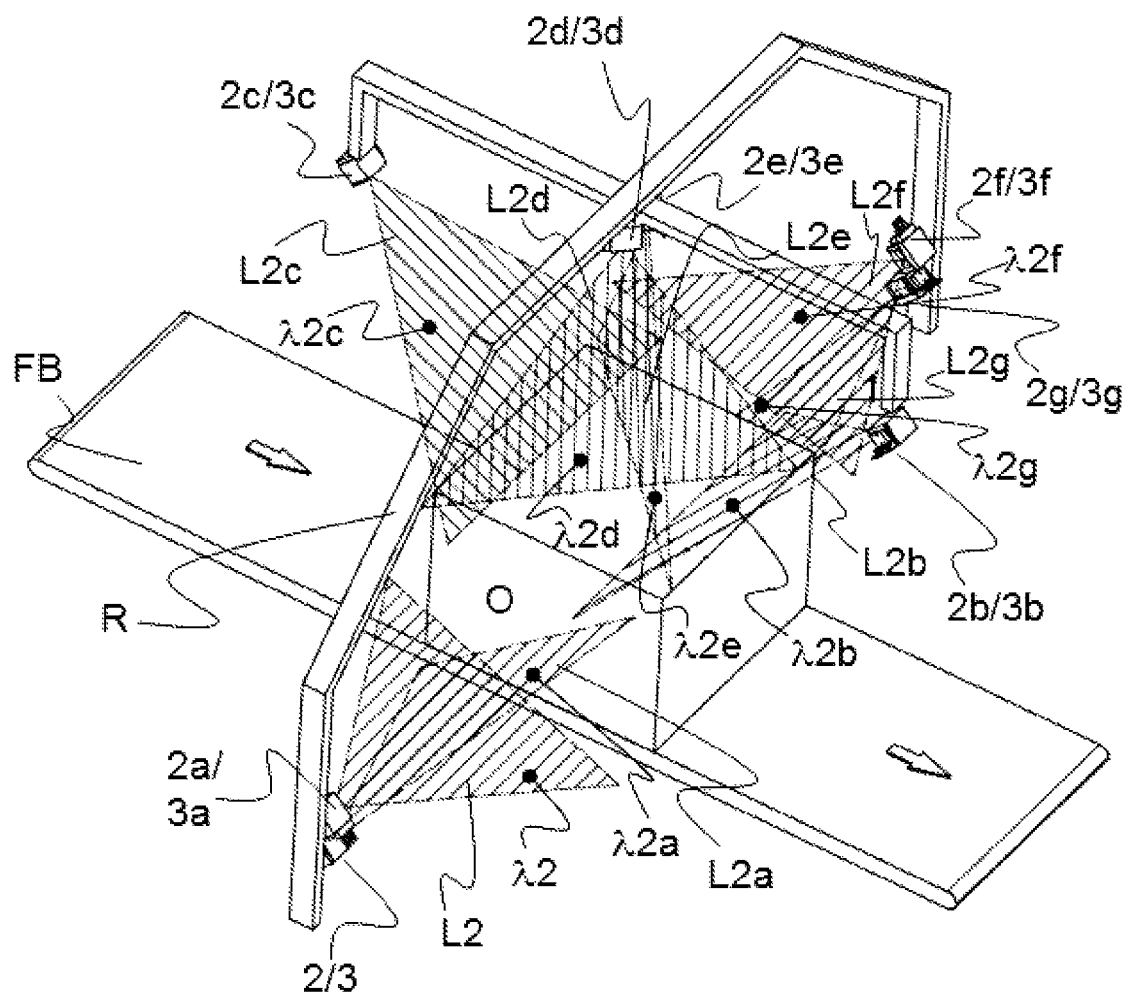

The invention will also be explained in the following with respect to further advantages and features with reference to the enclosed drawing and to embodiments. The Figures of the drawing show in:

FIG. 1 a schematic representation of an image detection system in accordance with the invention;

FIG. 2 the schematic detailed representation of an embodiment of the image detection system in accordance with the invention;

FIG. 3 the schematic detailed representation of a further embodiment of the image detection system in accordance with the invention with five lighting units and light reception units; and FIG. 4 the schematic detailed representation of a further embodiment of the image detection system in accordance with the invention with eight lighting units and light reception units.

FIG. 1 shows a schematic representation of an image detection system 1 in accordance with the invention which has, in the embodiment, two lighting units 2, 2a and two light reception units 3, 3a. A respective one lighting unit 2, 2a is associated with a light reception unit 3, 3a so that the two lighting units 2, 2a or light reception units 3, 3a are set up at an angle of approximately 45° with respect to one another on one side of the conveyor belt FB.

The lighting units and light reception units 2, 2a, 3, 3a define a detection zone EB on the conveyor belt FB such that an object O conveyed on the conveyor belt FB is lighted by the lighting units 2, 2a in the detection zone EB. The light reflected at the object O is detected by the light reception units 3, 3a so that the contour of the object O is detectable.

For this purpose, each lighting unit 2, 2a is a light source which transmits a light beam L2, L2a at a defined light wavelength 12, 12a, in particular light in different colors, in the direction of the conveyor belt FB. The light beams L2, L2a define a reading one LB for the respective lighting units and light reception units 2, 2a, 3, 3a and respectively form a lighting line such as shown in the Figure by the lines in particular drawn perpendicular to the conveyor belt FB.

Since the reading zones LB of the two lighting units and light reception units 2, 2a, 3, 3a or the lighting line of the two lighting units 2, 2a intersect at the object O, the lighting units 2, 2a transmit light beams L2, L2a at different light wavelengths $\lambda 2$, $\lambda 2a$, in particular light in different colors. The light reception unit 3, 3a associated with the respective lighting unit 2, 2a is configured such that it can only receive the reflected light at the corresponding defined light wavelength $\lambda 2$, $\lambda 2a$, i.e. in particular the assigned color.

This in particular means that the light reception unit 3, 3a comprises a line scan camera for the detection of the lighting line having an optical filter for the associated defined light wavelength $\lambda 2$, $\lambda 2a$ so that in the specifically described embodiment, a lighting unit 2 transmits a light beam L2 at the light wavelength $\lambda 2$ of the color red and the other lighting unit 2a transmits a light beam L2a at the light wavelength $\lambda 2a$ of the color blue. The one line scan camera only receives reflected light at the light wavelength $\lambda 2$ of the color red through the optical filter and the other line scan camera likewise only receives reflected light at the light wavelength $\lambda 2a$ of the color blue through the associated optical filter.

Although the two light beams L2, L2a of the lighting units and light reception units 2, 2a, 3, 3a meet one another at the intersection point at the object O, an overexposure of the object O is thereby avoided so that no mutual influencing of the light reception units 3, 3a or of the line scan cameras takes place by the lighting unit 2a, 2 associated with the respective other light reception unit 3a, 3 and an interference-free image detection can be carried out.

A preferred embodiment is shown in FIG. 2, with the same reference numerals standing for the same elements as in FIG. 1.

In the embodiment, the conveyor belt FB is detected from the side by the lighting unit and light reception unit 2, 3 and from above by a further lighting unit and light reception unit 2a, 3a.

The object O conveyed on the conveyor belt FB is thus, unlike the embodiment in FIG. 1, detected from two sides by the lighting units and light reception units 2, 2a; 3, 3a. In this respect, the reading zones LB of the two lighting units and light reception units 2, 2a; 3, 3a intersect at two sides of the object O.

Since two different light wavelengths $\lambda 2$, $\lambda 2a$, in particular different colors, are used horizontally and vertically to the conveyor belt FB for lighting the object O and since the light reception units 3, 3a arranged horizontally and vertically to the conveyor belt FB are only configured for the respective light wavelength $\lambda 2$, $\lambda 2a$, the contour of the object O can be detected precisely without mutual influencing of the light beams L2, L2a.

For a complete detection of the contour of the object O on the conveyor belt FB, a plurality of lighting units and light reception units 2, 2a-2d; 3, 3a-3d are provided, as shown in the embodiment in FIG. 3, so that the object O on the conveyor belt FB is lighted by a corresponding number of light beams L2, L2a-L2D at corresponding light wavelengths $\lambda 2$, $\lambda 2a$-$\lambda 2d$.

In this respect, a respective two lighting units and light reception units 2, 2a; 2b, 2c; 3, 3a; 3b, 3c are provided at both sides of the conveyor belt FB, with the respective two lighting units and light reception units 2, 2a; 3, 3a; 2b, 2c; 3b, 3c arranged at one side of the conveyor belt FB being aligned at an angle of approximately 45° with respect to one another so that their light beams L2, L2a; L2b, L2c partly intersect above the object O at the respective light wavelengths $\lambda 2$, $\lambda 2a$; $\lambda 2b$, $\lambda 2c$, in particular light in different colors.

The object O is thus lighted at its two sides twice by two respective light beams L2, L2a; L2b, L2c.

Further lighting units and light reception units 2d, 3d, which respectively light or detect the object O from above are provided above the conveyor belt FB and thus vertically spaced apart from the four lighting units and light reception units 2, 2a-2c; 3. 3a-3d arranged laterally at the conveyor belt FB.

In this respect, in accordance with the invention, the intersecting light beams L2, L2a; L2b, L2c have different light wavelengths $\lambda 2$, $\lambda 2a$; $\lambda 2b$, $\lambda 2c$, in particular light in different colors, from one another. The non-intersecting light beams L2, L2b; L2a, L2c, i.e. in particular the lighting units and light reception units 2, 2b; 2a, 2c; 3, 3b; 3a, 3c arranged diagonally opposite the conveyor belt FB, can have the same light wavelengths $\lambda 2$, $\lambda 2b$; $\lambda 2a$, $\lambda 2c$, in particular light of the same color, since they do not mutually negatively influence one another.

This specifically means that the two first lighting units 2, 2b arranged diagonally opposite transmit light beams L2, L2b at the light wavelengths $\lambda 2$, $\lambda 2b$ of the color red and the two other lighting units 2a, 2c arranged diagonally opposite transmit light beams L2a, L2c at the light wavelengths $\lambda 2a$, $\lambda 2c$ of the color blue. The light reception units 3, 3a-3c associated with the lighting units 2, 2a-2c are configured for receiving the respective light wavelengths λ2, λ2a-λ2c.

The light beam 2d of the vertically arranged lighting unit 2d intersects with all other light beams L2, L2a-L2c of the lighting units 2, 2a-2c arranged laterally at the conveyor belt FB so that the light beam L2d of the vertically arranged lighting unit 2d comprises a light wavelength λ2d different from the other light beams L2, L2a-L2c. By way of example, the light wavelength λ2d can be of the color yellow so that the light reception units 3, 3a-3d do not undergo any interference on the detection of the object O despite the crossover of the light beams L2, L2a-L2d.

A further embodiment of the image detection system in accordance with the invention is shown in FIG. 4 in which instead of the previous embodiment, eight lighting units and associated light reception units 2, 2a-2g; 3, 3a-3g are provided.

The lighting units and light reception units 2, 3a-3g; 3, 3a-3g are mounted at a frame R around the conveyor belt FB so that the two lateral walls of the object O which are directed in parallel with the conveyor belt direction are lighted by two respective lighting units 2, 2a; 2f, 2g and are detected by two associated light reception units 3, 3a; 3f, 3g.

The lateral light beams L2, L2a; L2f, L2g have mutually different light wavelengths λ2, λ2a; λ2f, λ2g.

The front side and the rear side of the object O are lighted by two further lighting units 2b, 2c and are likewise detected by two associated light reception units 3b, 3c, wherein these lighting units 2b, 3c also transmit light beams L2b, L2c at mutually different light wavelengths λ2b, λ2c, in particular light in different colors.

In addition to the lateral detections, the upper wall of the object O is lighted by two lighting units 2d, 3c provided at the upper frame R with light beams L2d, L2e of different light wavelengths λ2d, λ2e. The contour of the upper wall of the object O is detected by the associated light reception units 3d, 3e by means of detection of the reflected light at the light wavelengths λ2d, λ2e of the upper lighting units 2d, 2e.

The walls of the object O can be detected without overexposure and thus without interference by the transmission of the light beams L2, L2a-L2g at different light wavelengths λ2, λ2a-λ2g.

In accordance with an embodiment not described, lighting units 2, 2a-2g are used which transmit normal light at the defined light wavelengths λ2, λ2a-λ2g. Only the light reception units 3, 3a-3g are equipped with different optical filters for different light wavelengths λ2, λ2a-λ2g so that each light reception unit 3, 3a-3g, in accordance with its optical filter, only receives the light wavelength λ2, λ2a-λ3g for which the light reception unit 3, 3a-3g is provided. An overexposure or negative influencing of the light reception unit 3, 3a-3g by the other light wavelengths λ2, λ2a-λ2γ can thereby be avoided.

An exact image detection of the object and a simple configuration of the image detection system can thus be achieved.

REFERENCE NUMERAL LIST 1 image detection system
2, 2a-2g lighting unit
3, 3a-3g light reception unit
EB detection zone
FB conveyor belt
L2, L2a-L2g light beam
LB reading zone
λ2, λ2a-λ2g light wavelength
O object
R frame

The invention claimed is:

1. An image detection system for detecting an object comprising:
    a defined detection zone allowing detection of the object moved through plural detection zones;
    at least two lighting units for lighting the detection zone with a respective light beam, each lighting unit comprising a light source each lighting unit transmitting a light beam at a defined light wavelength and using different light wavelengths, so as to illuminate the object moving through the detection zone with at least one of the lighting units, wherein the light beams intersect and the intersecting lighting units associated with the intersecting light beams transmit the light beams at the different light wavelengths; and
    at least two light reception units comprising a line scan camera for receiving light reflected at the object, wherein one respective lighting unit is associated with a light reception unit, wherein the lighting units each transmit their light beams at a defined light wavelength and the light reception units are configured to receive a respective defined light wavelength of the reflected light associated with them, wherein the one light reception unit receives a different light wavelength than the other light reception unit, the lighting units and light reception units defining the detection zone, illuminating the object with light in the detection zone at the defined wavelengths of the lighting units, and the light reception units detect light at the defined light wavelength reflected by the object, establishing reading zones for the lighting units and light receptions units as pairs, wherein each pair intersects at the object at different light wavelengths corresponding to the defined wavelengths of the lighting units and light reception units in the pair, with the respective light reception unit in each pair configured such that it can only receive the reflected light at the corresponding defined light wavelength of the lighting unit in that pair,
    wherein the lighting units whose light beams intersect transmit light beams of different light wavelengths and the lighting units whose light beams do not intersect transmit light beams of the same light wavelengths.

2. The image processing system in accordance with claim 1, wherein the light reception unit comprises a line scan camera having an optical filter for the associated defined light wavelength.

3. The image processing system in accordance with claim 1, wherein the lighting unit and the light reception unit have a reading zone which is defined by the light beam at the defined light wavelength.

4. The image processing system in accordance with claim 3, wherein the lighting units and light reception units are arranged such that the reading zones of the lighting units and light reception units partly cross over so that the object is lighted at the crossover of at least two light beams at different light wavelengths.

5. The image processing system in accordance with claim 3, wherein the lighting units and light reception units are arranged such that the reading zones of the lighting units and light reception units partly cross over at 45° with respect to one another.

6. The image processing system in accordance with claim 1, wherein a plurality of lighting units and light reception units are provided which are directed toward one another and the object is lighted by a corresponding number of light beams at corresponding light wavelengths so that all the sides of the object are detectable.

7. The image processing system in accordance with claim 1, wherein the light beams comprise light wavelengths selected from the group consisting of the colors red, blue, yellow and green.

8. An image detection system for detecting an object comprising:
   a defined detection zone allowing detection of the object moved through plural detection zones;
   at least two lighting units for lighting the detection zone with a respective light beam, each lighting unit comprising a light source, each lighting unit transmitting a light beam at a defined light wavelength and using different light wavelengths, so as to illuminate the object moving through the detection zone with at least one of the lighting units, wherein the light beams intersect and the intersecting lighting units associated with the intersecting light beams transmit the light beams at the different light wavelengths; and
   at least two light reception units comprising a line scan camera for receiving light reflected at the object, wherein one respective lighting unit is associated with a light reception unit, wherein the lighting units each transmit their light beams at a defined light wavelength and the light reception units are configured to receive a respective defined light wavelength of the reflected light associated with them, wherein the one light reception unit receives a different light wavelength than the other light reception unit, the lighting units and light reception units defining the detection zone, illuminating the object with light in the detection zone at the defined wavelengths of the lighting units, and the light reception units detect light at the defined light wavelength reflected by the object, thereby detecting a contour of the object, thus establishing reading zones for the lighting units and light receptions units as pairs, wherein each pair intersects at the object at different light wavelengths corresponding to the defined wavelengths of the lighting units and light reception units in the pair, with the respective light reception unit in each pair configured such that it can only receive the reflected light at the corresponding defined light wavelength of the lighting unit in that pair,
   wherein the lighting units whose light beams intersect transmit light beams of different light wavelengths and the lighting units whose light beams do not intersect transmit light beams of the same light wavelengths.

9. The image processing system in accordance with claim 8, wherein the light reception unit comprises a line scan camera having an optical filter for the associated defined light wavelength.

10. The image processing system in accordance with claim 8, wherein the lighting unit and the light reception unit have a reading zone which is defined by the light beam at the defined light wavelength.

11. The image processing system in accordance with claim 10, wherein the lighting units and light reception units are arranged such that the reading zones of the lighting units and light reception units partly cross over so that the object is lighted at the crossover of at least two light beams at different light wavelengths.

12. The image processing system in accordance with claim 10, wherein the lighting units and light reception units are arranged such that the reading zones of the lighting units and light reception units partly cross over at 45° with respect to one another.

13. The image processing system in accordance with claim 8, wherein a plurality of lighting units and light reception units are provided which are directed toward one another and the object is lighted by a corresponding number of light beams at corresponding light wavelengths so that all the sides of the object are detectable.

14. The image processing system in accordance with claim 8, wherein the light beams comprise light wavelengths selected from the group consisting of the colors red, blue, yellow and green.

* * * * *